(12) United States Patent
Harker et al.

(10) Patent No.: US 9,368,800 B2
(45) Date of Patent: Jun. 14, 2016

(54) STAMPED BATTERY GRID WITH KINKED GRID WIRES

(75) Inventors: Brian Harker, Sturgis, MI (US); Kent Lancaster, Sturgis, MI (US)

(73) Assignee: Oak Press Solutions Inc., Sturgis, MI (US)

( * ) Notice: Subject to any disclaimer, the term of this patent is extended or adjusted under 35 U.S.C. 154(b) by 440 days.

(21) Appl. No.: 13/602,630

(22) Filed: Sep. 4, 2012

(65) Prior Publication Data

US 2013/0065121 A1 Mar. 14, 2013

Related U.S. Application Data

(60) Provisional application No. 61/573,747, filed on Sep. 12, 2011.

(51) Int. Cl.
*H01M 4/02* (2006.01)
*H01M 4/64* (2006.01)
*H01M 4/72* (2006.01)
*H01M 4/73* (2006.01)

(52) U.S. Cl.
CPC ...................... *H01M 4/72* (2013.01)

(58) Field of Classification Search
USPC ............... 429/208, 209–246; 29/623.1–623.5
See application file for complete search history.

(56) References Cited

U.S. PATENT DOCUMENTS

| | | | |
|---|---|---|---|
| 397,796 A * | 2/1889 | Gibson | 429/239 |
| 704,739 A * | 7/1902 | Entz | 429/239 |
| 3,249,981 A * | 5/1966 | Sabatino | 29/2 |
| 4,151,331 A | 4/1979 | Frazier et al. | |
| 4,271,245 A * | 6/1981 | Suzuki et al. | 429/243 |
| 5,989,749 A | 11/1999 | Kao et al. | |
| 6,203,948 B1 | 3/2001 | Kao et al. | |
| 6,274,274 B1 | 8/2001 | Schaeffer et al. | |
| 6,921,611 B2 | 7/2005 | Schaeffer et al. | |
| 6,953,641 B2 | 10/2005 | Chen | |
| 7,398,581 B2 | 7/2008 | Chen | |
| D591,677 S | 5/2009 | Vincze et al. | |
| 7,763,084 B2 | 7/2010 | Chen | |
| 7,799,463 B2 | 9/2010 | Schaeffer et al. | |
| 2007/0193009 A1 | 8/2007 | Vincze et al. | |
| 2009/0258299 A1 | 10/2009 | Kao et al. | |

* cited by examiner

*Primary Examiner* — Basia Ridley
*Assistant Examiner* — Caitlin Wilmot
(74) *Attorney, Agent, or Firm* — Pauly, DeVries Smith & Deffner LLC

(57) ABSTRACT

A grid for a battery having a plurality of spaced apart vertically extending and horizontally extending grid wire elements with each grid wire element having opposed ends joined to one of a plurality of nodes to define a plurality of open spaces and with selected ones of the grid wire elements being joined at one of their ends to frame elements. Oppositely facing sides of the grid wire elements define first and second planes that are parallel to each other. Selected ones of the frame elements have an undulating cross section across the width thereof with an apex of the undulation on one side of the grid being tangential to or terminating at a third plane that is separate from and parallel to the first and second planes.

16 Claims, 4 Drawing Sheets

STAMPED BATTERY GRID WITH KINKED GRID WIRES

CROSS REFERENCE TO RELATED APPLICATION

This claims the benefit of U.S. Provisional Application No. 61/573,747, filed Sep. 12, 2011, the disclosure of which is hereby incorporated by reference in its entirety.

FIELD OF THE INVENTION

This invention relates to a grid for a lead acid battery, hereinafter referred to as a grid.

BACKGROUND OF THE INVENTION

It is known to stamp battery grids from an elongate strip of lead moving through a stamping press. U.S. Pat. Nos. 5,989,749, 6,203,948, 6,274,274, 6,921,611, 6,953,641 7,398,581, 7,763,084 and 7,799,463 are representative examples of this known art. Traditionally, stamped grids have a single plane which inhibits the ability to accurately apply active material to both sides of the stamped grid in thicknesses greater than the internal grid wire thickness. Accordingly, this invention arose out of a desire to apply even amounts of active material to both sides of the stamped grid extending beyond the thickness of the internal grid wires.

SUMMARY OF THE INVENTION

The objects and purposes of the invention are met by providing a grid for a battery composed of a grid network bordered by frame elements with one of the frame elements having a current collector lug. The grid network has a plurality of spaced apart vertically extending and horizontally extending grid wire elements with each grid wire element having opposed ends joined to one of a plurality of nodes to define a plurality of open spaces and with selected ones of the grid wire elements being joined at one of their ends to the frame elements. Oppositely facing sides of the grid wire elements define first and second planes that are parallel to each other. Each of the frame elements has an undulating cross section across the width thereof with an apex of the undulation on one side of the grid being tangent with a third plane that is separate from and parallel to the first and second planes.

BRIEF DESCRIPTION OF THE DRAWINGS

Other objects and purposes of the invention will be apparent to persons acquainted with apparatus of this general type upon reading the following specification and inspecting the accompanying drawings, in which.

DETAILED DESCRIPTION

Figure 1:
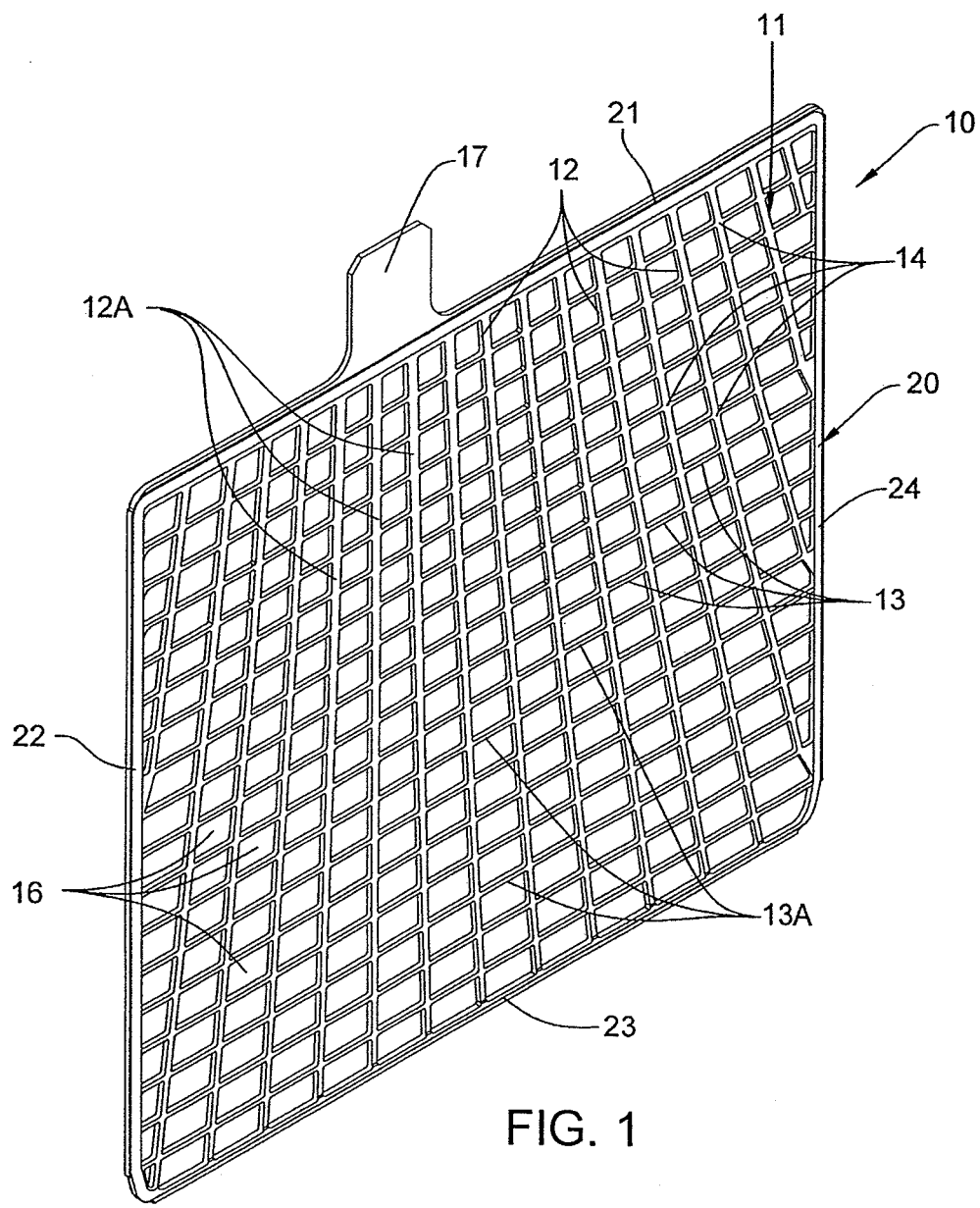
FIG. 1 is an isometric view of a grid for a battery embodying our invention.
Figure 2:
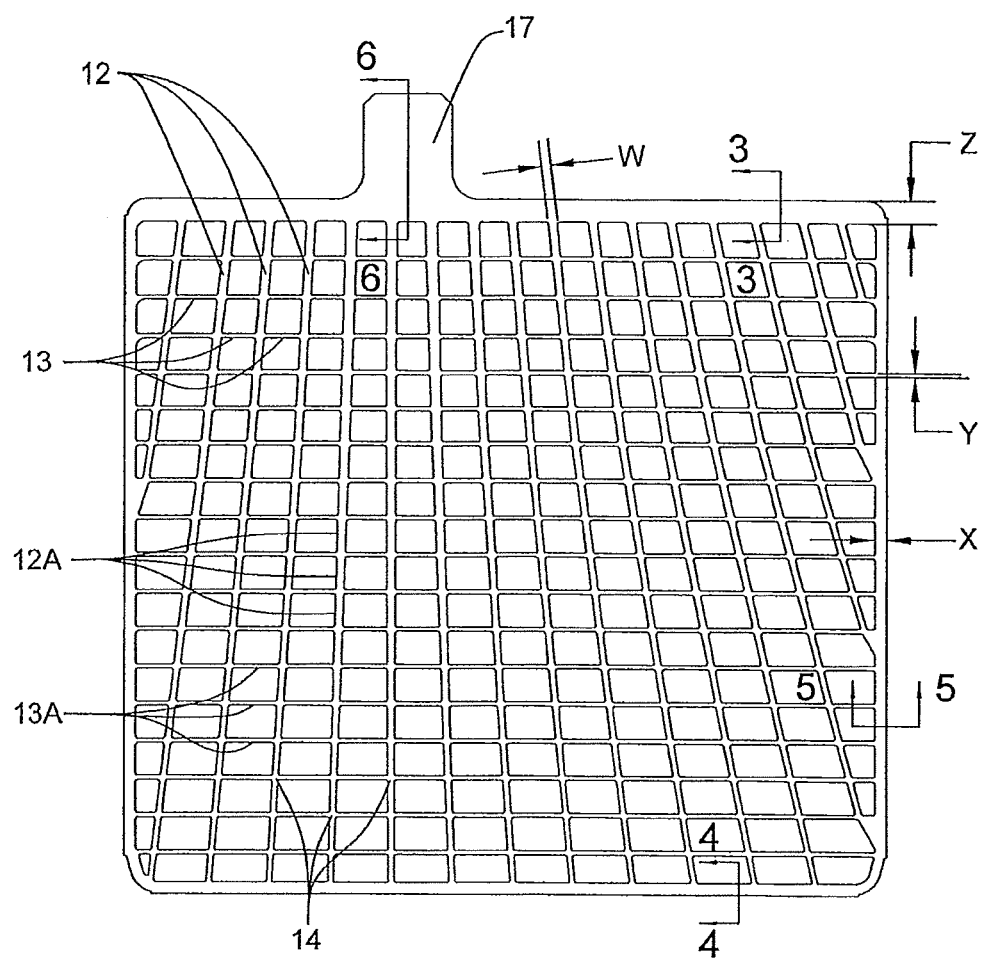
FIG. 2 is a front view of the grid.
Figure 3:
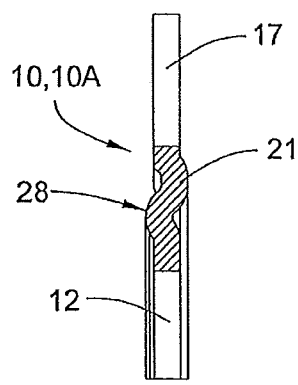
FIG. 3 is a sectional view taken along the line 3-3 in FIG. 2.
Figure 4:
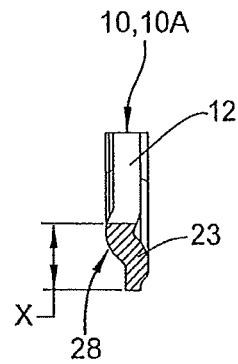
FIG. 4 is a sectional view taken along the line 4-4 in FIG. 2.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Figure 7:
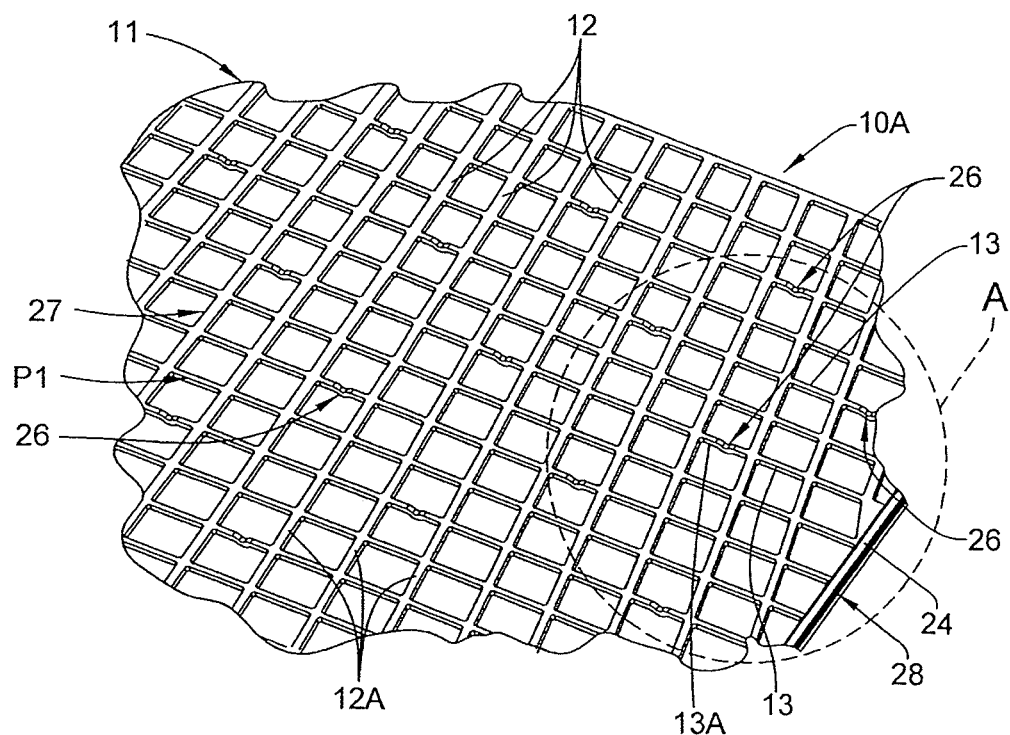
FIG. 7 is an enlarged isometric view of a modified grid wire configuration having kinks therein.
Figure 8:
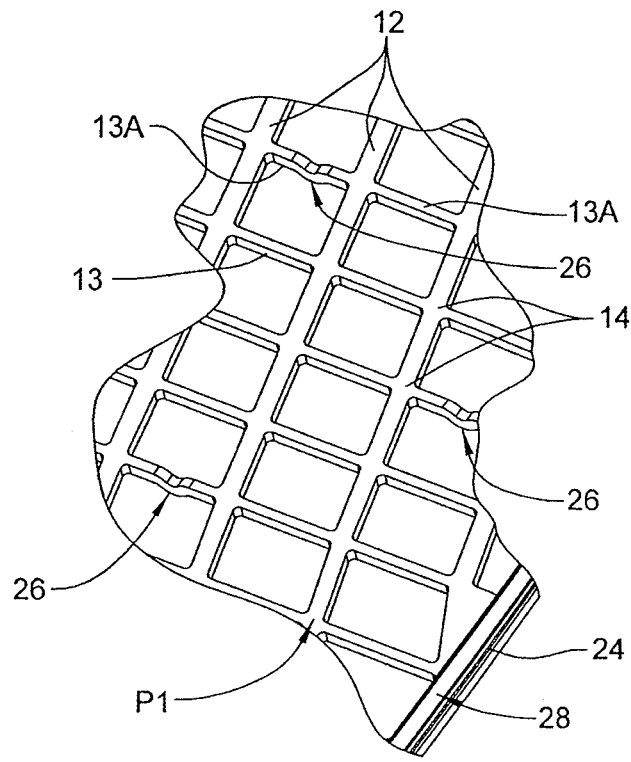
FIG. 8 is an enlarged isometric fragment marked by the circle "A" in FIG. 7 and as viewed from one side of the grid.
Figure 9:
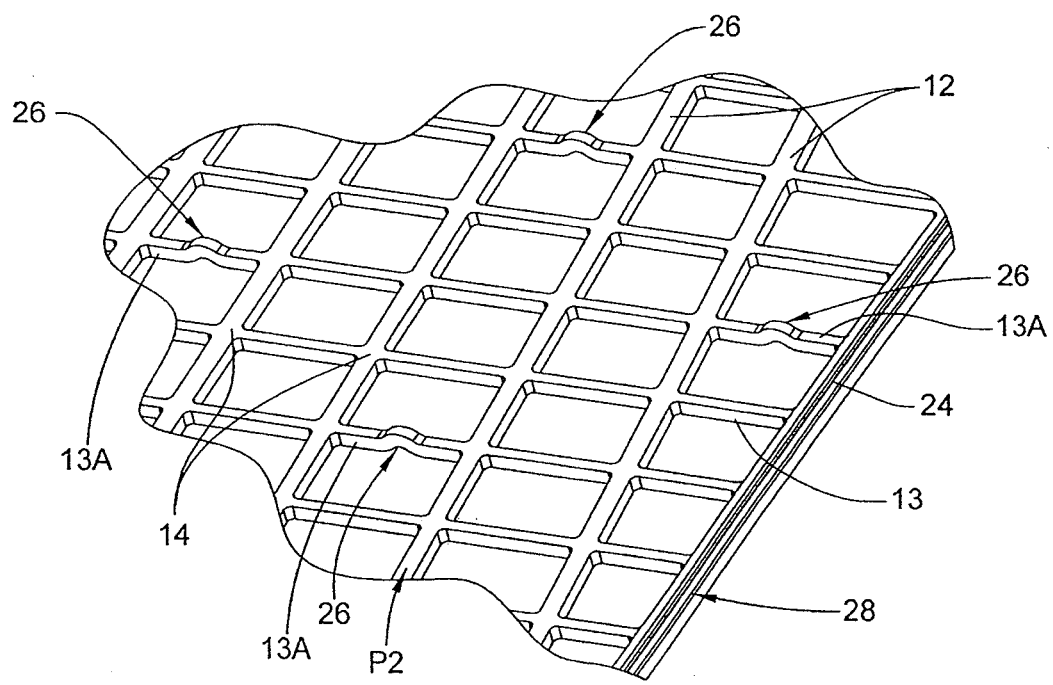
FIG. 9 is an enlarged isometric fragment marked by the circle "A" in FIG. 7 and as viewed from a side of the grid that is opposite to the side shown in FIG. 8.

FIGS. 1-6 illustrate a first embodiment of our invention and FIGS. 7-9 illustrate a second embodiment of our invention. Each of these embodiments will now be discussed in detail.

FIG. 1 is an isometric view of the grid 10 for a battery embodying a first version of our invention. The grid 10 has a grid wire network 11 composed of a plurality of vertically extending grid wires 12, which in turn is composed of grid wire elements 12A, and a plurality of horizontally extending grid wires 13, which in turn is composed of grid wire elements 13A joined to the vertical grid wire elements 12A at a plurality of separate nodes 14 to define a plurality of open spaces 16. The vertically extending wires 12 and the horizontally extending wires 13 are bordered by a frame 20 composed of frame elements 21, 22, 23 and 24. Each of the vertically extending grid wires 12 are joined at opposite ends to frame elements 21 and 23 whereas opposite ends of the horizontally extending grid wires 13 are joined at opposite ends to frame elements 22 and 24. In this particular embodiment, the vertically extending grid wires 12 and the horizontally extending grid wires 13 are uniformly rectangular in cross section with only the width varying in the vertically extending grid wires. In other words, the vertically extending grid wires 12 are tapered from a small rectangular cross section near the bottom frame element 23 to a larger rectangular cross section near the top frame element 21.

The frame elements 21-24 of the frame 20 have a lateral width "X" that is greater the lateral width "Y" of at least the horizontally extending grid wires 12. The lateral width "W" of the upper ends of the vertically extending grid wires 12 is in most cases less than the lateral width "Z" of the frame element 21 but can be equal to or greater than the lateral width of the frame element 21. A lug 17 extends upwardly from the frame element 21.

Figure 5:
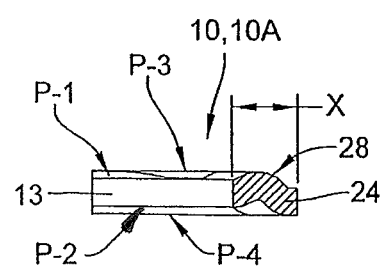
FIG. 5 is a sectional view taken along the line 5-5 in FIG. 2.
Figure 6:
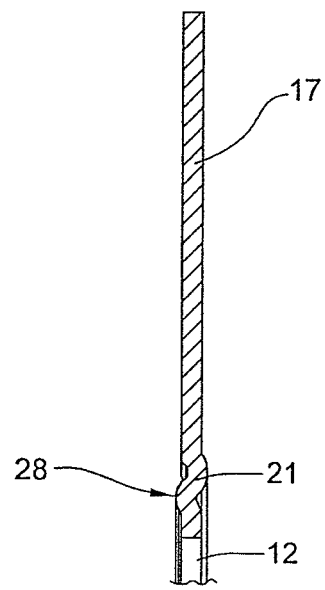
FIG. 6 is a sectional view taken along the line 6-6 in FIG. 2.

Selected ones of the frame elements 21-24 have an undulating cross section 28 across the lateral width "Z" thereof as shown in FIGS. 3-6. This undulating feature is also referred to as an "embossed border". In this particular embodiment, the cross sectional shape of the undulations is "S" shaped undulating above and below first and second parallel planes P-1 and P-2 defined by the oppositely facing sides of the grid wires 12 and 13 as shown in FIG. 5. Other forms for the undulations are to be considered as within the scope of this invention, such as a W-shape, a V-shape and a U-shape to name a few examples thereof. The spacing between the planes P-1 and P-2 represents the thickness of the grid wires 12 and 13. The undulations above the plane P-1 extend to become tangential to or terminate at a third plane P-3 containing the peaks of the undulations on one side of the grid wires and the undulations below the plane P-2 extend to become tangential to or terminate at a fourth plane P-4 containing the peaks of the undulations on the other side of the grid wires and as depicted in FIG. 5. The third and fourth planes P-3 and P-4 are parallel to the first and second parallel planes P-1 and P-2. The spacing between the third and fourth parallel planes P-3 and P-4 can be controlled to a dimension that is up to four times the spacing between the first and second planes P-1 and P-2 with the preferred spacing between the third and fourth planes P-3 and P-4 being up to two times the spacing between the first and second planes P-1 and P-2.

There are several advantages to providing the undulating feature on the frame elements 21 to 24. They are:
1. Increased Strength/Rigidity of the Grid 10
   a. The embossed border will add strength to the frame 20 of the grid and resist bending.
   b. It will also help with applications using very soft lead (i.e. near pure lead grids).
2. Simplify Over-Pasting
   a. The embossed border will simplify the ability to apply active material to both sides of the grid 10 with conventional pasting equipment. Special pasting equipment is required to apply active material to both sides of a flat grid.
3. Complete Coverage of Grid Wires
   a. The embossed border will allow the active material to completely surround the grid wires. With a flat grid (i.e. no embossed border), it is very difficult to get the active material completely around the grid wire because the grid is lying on a table and the paste is pushed into the grid from the top. The embossed border keeps the grid wires elevated off the table and allows the active material to completely envelop the grid wire.
4. Consistent Coverage of Grid Wires on Both Sides
   a. The embossed border will make it easy to apply equal amounts of active material to the top and bottom of the grid wires.
5. Increase Amount of Active Material on the Grid
   a. The embossed border will allow more active material to be applied to the grid.
   b. This will allow manufacturers to use thinner grid material, thus, saving lead.
6. Increase Adhesion/Cohesion Between Active Material and Grid Wires
   a. By completely surrounding the grid wires, there will be an increase in the surface contact area between the active material and the grid wire. This will increase the adhesion/cohesion between the active material and grid wires.
   b. The increased adhesion/cohesion between the wire and active material will lessen the chances of the active material dislodging.
7. Adjustability of Embossed Border
   a. The thickness of the embossed border can be adjusted to match the requirements of the grid being produced.

Referring to the embodiment of FIGS. 7-9 illustrating a modified grid 10A, FIG. 7 illustrates that several of the horizontally extending grid wire elements 13A have "kinks" or undulations 26 along a horizontally extending length of the grid wire elements. The material forming each of these kinks extends in a common direction, namely, when the grid 10A lies on a table surface, such as is suggested in FIG. 5, beyond the respective plane P-1 or P-2. FIG. 7 illustrates a front facing surface 27 of the grid network 11 as well as the surface containing the plane P-1. As FIG. 8 illustrates, the front facing surface of the material of the kinks 26 project below the plane P-1 whereas the material of the kinks projecting from the rear facing surface containing the plane P-2 illustrated in FIG. 9 does not extend beyond the respective plane P-4.

The purpose of the kinks or undulations 26 is to support the vertically extending grid wires 12 and horizontally extending wires 13 during the pasting process. The goal is to maintain the position of all internal grid wires between planes P-1 and P-2.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A grid for a battery, comprising:
   a grid network bordered by a frame comprising one or more frame elements, one of the frame elements having a current collector lug;
   the grid network comprising a plurality of spaced apart vertically extending and horizontally extending grid wire elements, each grid wire element having opposed ends, each opposed end being joined to one of a plurality of nodes to define a plurality of open spaces, selected ones of the grid wire elements being joined at one of their ends to the one or more frame elements, oppositely facing sides of the grid wire elements defining first and second planes that are parallel to each other;
   wherein selected ones of the horizontally extending grid wire elements have a kink formed therein causing the material of the grid wire element to extend beyond at least one of the respective first and second planes and having an apex on at least one side of the grid wire elements that is tangential to or terminating at a third plane but does not extend beyond the third plane;
   wherein the kinks are positioned on the horizontally extending grid wire elements between neighboring open spaces of the plurality of open spaces;
   wherein selected ones of the horizontally extending grid wire elements are planar;
   wherein at least one of the horizontally extending grid wire elements is parallel with the one frame element that has the collector lug.

2. The grid for a battery according to claim 1, wherein selected ones of the vertically extending grid wire elements are planar.

3. The grid for a battery according to claim 1, wherein selected ones of the horizontally extending grid wire elements are disposed between the first plane and the second plane.

4. The grid for a battery according to claim 2, wherein selected ones of the vertically extending grid wire elements are disposed between the first plane and the second plane.

5. The grid for a battery according to claim 1, wherein the frame elements each have a lateral width dimension greater than a width dimension of each of the grid wire elements.

6. A grid for a battery, comprising:
   a grid network bordered by a frame comprising one or more frame elements, one of the frame elements having a current collector lug;
   the grid network comprising a plurality of spaced apart vertically extending and horizontally extending grid wire elements, each grid wire element having opposed ends, each opposed end being joined to one of a plurality of nodes to define a plurality of open spaces, selected ones of the grid wire elements being joined at one of their ends to the one or more frame elements, oppositely facing sides of the grid wire elements defining first and second planes that are parallel to each other;

wherein selected ones of the horizontally extending grid wire elements have a kink formed therein causing the material of the grid wire element to extend beyond at least one of the respective first and second planes and having an apex on at least one side of the grid wire elements that is tangential to or terminating at a third plane but does not extend beyond the third plane;

wherein the kinks are positioned on the horizontally extending grid wire elements between neighboring open spaces of the plurality of open spaces;

wherein at least some of the horizontally extending grid wire elements that have a kink also comprise a planar portion.

7. The grid for a battery according to claim 6, wherein selected ones of the vertically extending grid wire elements are planar.

8. The grid for a battery according to claim 6, wherein selected ones of the horizontally extending grid wire elements are disposed between the first plane and the second plane.

9. The grid for a battery according to claim 7, wherein selected ones of the vertically extending grid wire elements are disposed between the first plane and the second plane.

10. The grid for a battery according to claim 6, wherein the frame elements each have a lateral width dimension greater than a width dimension of each of the grid wire elements.

11. The grid for a battery according to claim 1, wherein horizontally extending wires having kinks alternate with horizontally extending wires that are planar.

12. The grid for a battery according to claim 1, wherein the horizontally extending wires on either side of a horizontally extending wire having a kink are planar.

13. The grid for a battery according to claim 1, wherein there are at least two horizontally extending wires having kinks and at least two horizontally extending wires that are planar.

14. The grid for a battery according to claim 1, wherein the horizontally extending grid wire having a kink further comprises a planar portion.

15. The grid for a battery according to claim 6, wherein the planar portion is between two nodes.

16. The grid for a battery according to claim 6, wherein a section of the horizontally extending grid wire between two adjacent nodes comprises the kink and the planar portion.

* * * * *